United States Patent
Jagiella (12) 
(10) Patent No.: US 6,714,004 B2
(45) Date of Patent: Mar. 30, 2004

(54) INDUCTIVE POSITION MEASURING SYSTEM

(75) Inventor: Manfred Jagiella, Notzingen (DE)

(73) Assignee: BALLUFF GmbH, Neuhausen (DE)

(*) Notice: Subject to any disclaimer, the term of this patent is extended or adjusted under 35 U.S.C. 154(b) by 0 days.

(21) Appl. No.: 09/846,428

(22) Filed: May 1, 2001

(65) Prior Publication Data
US 2001/0052771 A1 Dec. 20, 2001

(30) Foreign Application Priority Data
May 24, 2000 (DE) .......................... 100 25 661

(51) Int. Cl.$^7$ .............................. G01B 7/14; G01D 5/20
(52) U.S. Cl. .......................... 324/207.16; 324/207.24; 324/207.25
(58) Field of Search ................. 324/207.16, 207.22, 324/207.24, 207.25, 207.19; 336/45

(56) References Cited

U.S. PATENT DOCUMENTS

| 5,204,621 A | 4/1993 | Hermann et al. |
| 5,619,133 A | * 4/1997 | Shank et al. ............ 324/207.24 |
| 5,867,022 A | 2/1999 | Eden et al. |

FOREIGN PATENT DOCUMENTS

| DE | 25 11 683 | 9/1976 |
| DE | 25 20 851 | 11/1976 |
| DE | 39 14 787 | 11/1990 |
| DE | 41 03 603 | 8/1991 |
| DE | 42 13 866 | 10/1992 |
| DE | 44 06 417 | 9/1995 |
| DE | 196 19 197 | 11/1997 |
| DE | 197 15 360 | 10/1998 |
| DE | 198 06 529 | 8/1999 |
| EP | 0 351 609 | 1/1990 |
| EP | 0 463 236 | 1/1992 |
| FR | 2 682 760 | 4/1993 |
| FR | 2 800 458 | 5/2001 |
| FR | 2 800 459 | 5/2001 |
| FR | 2 800 460 | 5/2001 |
| FR | 2 801 969 | 6/2001 |
| FR | 2 803 303 | 6/2001 |
| FR | 2 800 457 | 5/2002 |
| GB | 1 502 697 | 3/1978 |
| JP | 57-173701 | * 10/1902 ............ 324/207.19 |

* cited by examiner

Primary Examiner—Walter E. Snow
(74) Attorney, Agent, or Firm—Barry R. Lipsitz; Douglas M. McAllister (57) ABSTRACT

In order to provide a position measuring system, comprising a transmitter, a sensor with an inductive element to which the transmitter is coupled electromagnetically and an evaluating unit, wherein the sensor and the transmitter are adapted to be positioned relative to one another, whereby said position measuring system will be of simple construction and can thus be manufactured economically while being employable universally, provision is made for the inductive element to be coupled to an oscillator which is affected by the Q factor and/or the effective inductance of the inductive element, for the Q factor and/or the effective inductance of the inductive element to be determined by the size of an effective sensor region to which the transmitter is coupled, and/or by the size of an effective transmitter region which is coupled to an effective sensor region, and for the sensor and/or the transmitter to be formed in such a manner that the size of the effective sensor region to which the transmitter is coupled, and/or the size of the effective transmitter region which is coupled to the effective sensor region is dependent upon the relative position between the transmitter and the sensor in a direction transverse to a direction of separation therebetween.

39 Claims, 4 Drawing Sheets

INDUCTIVE POSITION MEASURING SYSTEM

BACKGROUND OF THE INVENTION

The invention relates to a position measuring system (path measuring system—position sensing system) comprising a transmitter, a sensor which comprises an inductive element to which the transmitter is coupled electromagnetically and an evaluating unit for a sensor signal, wherein the sensor and the transmitter are adapted to be positioned relative to one another.

Position measuring systems of this type are utilised, for example, for measuring the position of pneumatic cylinders, for measuring the position of valves (especially in control loops) or in gripper devices. It is very advantageous in such applications if a relative position between the transmitter and the sensor is measurable absolutely.

In a position sensor known from the state of the art, a secondary coil is wound over a longitudinally extending soft magnetic sensor core. Primary coils are wound around the respective ends of the sensor core. A magnet which is movable along the sensor core is used as a transmitter. A voltage is induced in the secondary coil when current passes through the primary coils. The magnet exerts an influence on this induced voltage thereby causing the magnetic sensor core located in its immediate vicinity to become saturated. The flow of current through the secondary coil is then affected by the relative position between the magnet and the soft magnetic sensor core so that the current through the secondary coil is dependent on the position of the magnet.

In a magneto-inductive sensor-line for magnetically determining the position and/or path of one of the magnets adjacent to the sensor line which is known from DE 43 11 973 A1, a plurality of flat coils that are arranged next to one another and/or above one another is provided on an extensive magnetically conductive layer which can be brought into a state of magnetic saturation, whereby the neighbouring coils form a transmitter-receiver system, and the position of the magnet affects the transmitting/receiving characteristics of the coils thereby allowing its position to be detected.

Inductive position indicators are known from DE 25 11 683 C3 and DE 39 13 861 A1, wherein a ferromagnetic core together with a primary coil traversed by an alternating current form a probe element which itself creates a magnetic flux. This magnetic flux is threaded through a secondary winding and the voltage induced in this winding is dependent on the position of the core.

A displacement sensor is known from FR 2 682 760 A1, wherein a primary circuit and a secondary circuit are arranged on a support. An alternating current is applied to the primary circuit which is coupled to the secondary circuit whereby an alternating voltage is induced therein. This induced voltage is affected by a transmitter consisting of a ferromagnetic material in dependence on the position of the transmitter relative to the secondary circuit.

Based upon the foregoing, the object of the invention is to provide a position measuring system which is of simple construction and can thus be manufactured economically, and which is employable universally.

BRIEF SUMMARY OF THE INVENTION

In accordance with the invention, this object is achieved in the case of a position measuring system as described hereinabove in that the inductive element is coupled to an oscillator which is affected by the Q factor and/or the effective inductance of the inductive element, in that the Q factor and/or the effective inductance of the inductive element is determined by the size of an effective sensor region to which the transmitter is coupled, and/or by the size of an effective transmitter region which is coupled to an effective sensor region, and in that the sensor and/or the transmitter are formed in such a manner that the size of the effective sensor region to which the transmitter is coupled, and/or the size of the effective transmitter region which is coupled to the effective sensor region is dependent on the relative position between the transmitter and the sensor in a direction transverse to a direction of separation therebetween.

Due to the fact that the inductive element is coupled to an oscillator and can affect the parameters of the oscillator such as the amplitude, the phase angle and the frequency thereof by means of its Q factor and/or effective inductance, a location-dependent coupling of the transmitter to the inductive element can be evaluated in a simple manner in that the corresponding parameters of the oscillator are evaluated. The inductive element, which is coupled to the oscillator, is thereby coupled to the oscillator in such a manner that the oscillator itself can be influenced. A special case of coupling between the inductive element and the oscillator arises when the inductive element itself forms the inductance in the oscillator. Thus, in accordance with the invention, it is not a voltage which has been induced in a secondary coil via a primary coil that is measured, but rather, it is the Q factor and/or the effective inductance of the inductive element in the sensor that is evaluated by means of the oscillator. Consequently, energy does not have to be supplied to a primary coil so that the position measuring system in accordance with the invention is constructed in a simpler manner. Moreover, by virtue of the device in accordance with the invention, the transmitter is in the form of a passive element so that, in particular, current does not have to be applied thereto over energy supply lines.

In accordance with the invention, provision is made for the Q factor and/or the effective inductance of the conductive element, which represents a measure for the relative position between the transmitter and the sensor, to be determined from the size of the effective sensor region and/or the size of the effective transmitter region. The sensor signal is thus determined by the geometrical structure of the sensor or the transmitter. The information in regard to the relative position between the transmitter and the sensor and thus the position information or path information regarding the relative position between the transmitter and the sensor is contained in the geometrical form of the effective sensor region or the effective transmitter region which are mutually coupled. In turn, the effective sensor region or the effective transmitter region is determined by the shape of the sensor, and thus especially by that of the inductive element, or by the shape of the transmitter. Consequently, the position measuring system in accordance with the invention is of simple construction and can be produced economically.

The position measuring system in accordance with the invention is employable universally, and may be employed, in particular, in a shaft encoder by virtue of an appropriate shaping of the sensor or the transmitter. Apart from the inductive element, no other secondary coil or the like needs to be provided. Basically, it is sufficient to provide a single inductive element which is constructed in such a manner that an effective sensor region and/or an effective transmitter region, which is coupled to the inductive element, is dependent on the relative position between the transmitter and the sensor. In addition however, it is also possible to provide further inductive elements. For example, difference measurements or sum measurements can be effected in this manner so as to obtain very accurate measurements having a high resolution factor. In accordance with the invention for example, provision may be made for the provision of a plurality of measurement tracks, for example, a measurement track for coarse measurements and a measurement track for fine measurements. Since the location information is in fact contained in the shape of the effective sensor or the effective transmitter region, a plurality of different applications can be implemented by appropriate shaping.

The resolution of the measurement is thereby adapted to be set directly by the shape of the effective sensor region or the effective transmitter region. Resolutions in the order of at least one thousandth of the total path, which the sensor and the transmitter can adopt relative to one another, can thereby be implemented unproblematically.

Since the sensor signal is determined by an effective sensor region and/or by an effective transmitter region so that the sensor signal is determined directly by an effective inductance of the inductive element in the sensor, known evaluating circuits for inductive proximity switches, in which the proximity of a metal object to an oscillator coil is registered by means of a change in amplitude or a change in frequency of the oscillator for example, can be used. Consequently, use may be made of currently available evaluating units. In particular, the position measuring system in accordance with the invention may be provided with a type of evaluating unit independently of the particular shape of the transmitter or the inductive element since, in essence, the evaluating unit is only determining a characteristic value of this inductive element.

It is advantageous if the sensor and/or the transmitter are formed in such a manner that an overlapping region between a projection of an effective transmitter surface area onto the sensor having an effective sensor surface area is dependent on the relative position between the sensor and the transmitter transversely relative to the direction of projection. The shape of the sensor and especially that of the inductive element and/or the shape of the transmitter, by virtue of which the effective sensor surface area or the effective transmitter surface area is in each case determined, then determines the dependency of the coupling between the sensor and the transmitter transversely relative to the direction of projection. In turn, the relative position between the sensor and the transmitter in a direction transverse to the direction of projection (transverse relative to the direction of spacing between the sensor and the transmitter) can be determined from this dependency.

The relative position between the transmitter and the sensor can be determined in a simple manner if the evaluating unit determines a characteristic value of the oscillator. A transmitter, which is made of metal and, in particular, is electrically conductive or magnetic, represents a mutual inductance with regard to the inductive element of the sensor. This coupling of the inductances produces an alteration in the effective inductance of the inductive element. This change in the effective inductances can be measured in a simple manner. In one variant of an embodiment, provision is made for a frequency of the oscillator, to which the inductive element is coupled, to be determined as the characteristic value of the oscillator. The frequency of an LC oscillatory circuit is substantially inversely proportional to the square root of the effective inductance. This can then be determined in a simple manner. This variant is particularly advantageous when the transmitter is a magnet since a relatively large change in inductance can thereby occur, such a change being correspondingly effective on the frequency of the oscillatory circuit especially when a soft magnetic material, which can be brought into a state of saturation, is arranged on the sensor.

In one alternative variant of an embodiment, an amplitude of the oscillator, to which the inductive element is coupled, is determined. The amplitude of an oscillator and especially of an oscillatory circuit is, in turn, dependent on the effective inductance or Q factor of the inductive element in the sensor. It can be determined in a simple manner. In particular, changes in amplitude can be detected which are relatively small. The effective inductance of the inductive element can also be evaluated thereby, especially when the transmitter is a non-magnetic metal.

It is particularly very advantageous if the inductive element is of extensive form (two-dimensional) and especially if it is in the form of a flat coil. The effective sensor region, to which the transmitter is coupled, is then located over an extensive area. Accordingly, the effective sensor region can be deliberately set by the shape of such a flat coil so as to enable the relative position between the sensor and the transmitter to be determined from the size of the effective sensor region. In addition, a flat coil can be produced in a simple manner and it is especially easy to replicate during manufacture; the manufacturing spread is considerably greater in the case of wound three-dimensional coils than it is for flat coils. Hereby, it is especially very advantageous if the inductive element is in the form of a printed coil. The corresponding windings of the coil can thereby be produced on a circuit board in a simple manner, for example, by means of an exposure process. Again, a plurality of coil shapes can thereby be produced so as to obtain a high degree of variability in regard to the application thereof.

It is expedient if the evaluating unit is arranged on a circuit board upon which the inductive element is seated. The evaluating unit and the inductive element are then integrated on a circuit board. The sensor in accordance with the invention can thereby be easily manufactured in an economical manner and, in addition, it is correspondingly easy to install it in a housing for example.

It is expedient if the measurable distance (extent of the path) between the transmitter and the sensor is basically determined by a linear dimension of the inductive element. Due to the shape of the inductive element, it is then possible to appropriately set up a measurement path for a special application, within which path the relative position between the sensor and the transmitter is determinable. A particular setting for the relevant parameters of the position measuring system in accordance with the invention can thereby be achieved from the shape of the inductive element due to the ease with which the inductive element can be produced, especially when it is in the form of a printed coil.

It is especially very advantageous if the transmitter is a passive element and particularly if it is manufactured from an electrically conductive or magnetically conductive material. Here, a passive transmitter is a transmitter which is such that it is not connected to a source of energy but with which an electromagnetic coupling to the inductive element can nevertheless be produced. A constructively simple construction of the position measuring system in accordance with the invention is thereby obtained, this being economical to manufacture and utilise since energy supply lines to the transmitter, which may possibly have to be moved therewith, do not have to be provided. It naturally follows, that a source of energy for the transmitter does not then need to be provided.

In one variant of an embodiment, the transmitter comprises a magnet. The magnetic field of the magnet influences the inductive element and the effect thereof is expressed, in particular, by a change in the effective inductance of the inductive element. In turn, this change in the effective inductance is dependent upon the effective sensor region of the inductive element which is being subjected to the magnetic field. Measurements can even be made through metallic walls with the aid of such a transmitter. For example, the position of a piston provided with such a transmitter can be detected externally through a wall of a pressurised cylinder made of aluminium.

It is expedient hereby if a soft magnetic material is arranged on or in the vicinity of the inductive element. The soft magnetic material may, for example, be a Mu-metal in the form of a foil which has maximum possible magnetic permeability and lowest possible electrical conductivity. The soft magnetic material can be magnetically saturated by the magnetic field of the transmitter and an effective sensor region is then defined by virtue of this local saturation. In turn, the local saturation in the effective sensor region produces a relatively large change in the effective inductance so that this can easily be detected.

In one variant of an embodiment, a soft magnetic material is deposited on a circuit board, for example, on one or both sides thereof, upon which the inductive element is seated. The sensor in accordance with the invention can then be produced in a simple manner. In particular, provision may be made for a circuit board, upon which the inductive element is seated, to have a soft magnetic material wound therearound.

An effective sensor region, which is dependent on the positioning of a transmitter relative to the sensor, can be established if the inductive element is designed such that the shape thereof along a measurement path varies in a direction transverse to said measurement path. Additionally, or as an alternative thereto, it is also possible for the soft magnetic material to be arranged in a form such that the dimensions of its shape transverse to a measurement path vary along said measurement path. Since a state of local saturation can be produced in an effective sensor region by virtue of the soft magnetic material, it is also possible for an effective sensor region to be determined by the shape of the soft magnetic material itself. Thus, in an area outside the soft magnetic material, the effects of the field applied to the sensor will differ from those of a field applied to the soft magnetic material so that the effective sensor region can then be determined by the manner in which the soft magnetic material is deposited. In particular, provision is made for the soft magnetic material to be arranged in the form of a triangle. The transverse dimension of the deposition of soft magnetic material thereby alters along the measurement path and the relative position between the transmitter and the sensor can be determined from this variation in the transverse dimension.

It is particularly very expedient if the inductive element is formed in such a manner that its shape transverse to a measurement path varies along said measurement path. This can be achieved in a simple manner by appropriately shaping the windings of a flat coil. The effective sensor region varies due to the change in the shape thereof transverse to the measurement path. The size of the effective sensor region is, in turn, responsible for the sensor signal and this sensor signal then incorporates the information in regard to the relative position between the sensor and the transmitter. In an easily producible variant of an embodiment, the inductive element comprises triangular windings. A larger surrounding surface is then present in the vicinity of a peak of the triangle than is the case in the vicinity of a base of the triangle. The size of an effective sensor region thereby again varies when a transmitter is coupled to the inductive element.

In one variant of an embodiment, the inductive element extends over an angular range for the purposes of measuring revolutions. If the transmitter is then moved in a circular track about the inductive element, the relative rotational position between the transmitter and the sensor can then be determined. Hereby, the inductive element is constructed in such a manner that an effective sensor region varies over the angular range. It is especially advantageous if the angular range comprises a substantially full circle. The rotational positions can thereby be measured in a complete angular range.

In another embodiment, the transmitter comprises an electrically conductive or a magnetically conductive element. This element is then inductively coupled to the inductive element in the sensor in the form of a mutual inductance and thereby alters the effective inductance of the inductive element. In turn, from this alteration, which is dependent on the relative position between the sensor and the transmitter, this relative position can then of course be determined. It is especially very advantageous hereby, if the projected overlapping area between an effective transmitter region and the inductive element varies along a measurement path. Basically, as has already been explained hereinabove, this variation can be achieved by appropriate construction of the inductive element. In dependence on the application, the transmitter may, for example, be in the form of a tongue, in the form of a hoop which can be moved over the inductive element, in the form of a ring having a rounded or rectangular cross-section for example, or in the form of a tube etc.

In one variant of an embodiment, provision is made for the transmitter to be formed in such a manner that an effective transmitter region, which is coupled to the inductive element, will vary in shape transverse to a measurement path along said measurement path. The effective transmitter region determines the coupling of the transmitter to the sensor. By appropriately shaping this effective transmitter region and, especially by virtue of a variation along the measurement path, the coupling is thereby then made dependent on the relative position between the transmitter and the sensor.

Again, this relative position can then be determined unambiguously from the sensor signal. In one variant of an embodiment, provision is made for the measurement path to be linear. In another variant, the measurement path is circular so that the position measuring system in accordance with the invention is especially adapted to be employed as a shaft encoder. The effective transmitter region is appropriately formed in dependence on the particular variant in which it is employed. In particular, the surface density of the transmitter alters along the measurement path so as to form an effective transmitter region having a variable cross-section.

In one variant of an embodiment, the transmitter is provided with a triangular structure. A variation in an effective transmitter region can thus be achieved in a simple manner by virtue of such a structure. If the triangular structure is arranged in the form of a ring then rotational movements can also be measured therewith.

For example, the effective transmitter region can be formed by means of a coating on the transmitter. The coating material may, for example, be a Mu-metal or a ferrite coating. Provision may also be made for the transmitter to be provided with recesses, especially through-passage openings. Since there is no transmitter material in these recesses, the effective transmitter region is thus dependent on the size and the distribution of the recesses over the transmitter.

In one advantageous variant of an embodiment of a position measuring system in accordance with the invention, the sensor is comprised by an inductive proximity sensor which comprises an oscillatory circuit with an inductive element. Proximity sensors of this type, which are especially in the form of analogue sensors, are known. These can be used with an appropriately constructed transmitter for effecting absolute position measurements for the relative position between the transmitter and the sensor. The relevant shaping of the transmitter i.e. the variation in the effective transmitter region which can be coupled to the proximity sensor, then determines the sensor signal which, in turn, then contains the relevant information in regard to the effective transmitter region and thus in regard to the relative position between the sensor and the transmitter.

It is expedient if a magnetic screening is provided for the inductive element. The inductive elements are thereby protected from stray fields and the like which could be coupled into the inductive element thereby falsifying the measurement signal. The accuracy of measurement is thereby increased due to the provision of such a magnetic screen which may, in particular, be in the form of a magnetic cage.

It is expedient if a plurality of inductive elements are provided. A wide range of possible applications is thereby achieved. For example, difference measurements or sum measurements could be carried out, or, the inductive elements could be arranged in such a manner that the sensor comprises a plurality of measurement tracks which could be used for coarse measurements and fine measurements for example.

In one variant of an embodiment, the sensor comprises a plurality of tracks formed by inductive elements. The tracks could be utilised for difference measurements for example, i.e. a differential system can be formed thereby. Here, the tracks may be formed in opposite senses or in the same sense. In addition, the shape of the tracks may differ so that, for example, one track is constructed for the purpose of making a fine measurement and one track is constructed for making a coarse measurement of the relative position between the sensor and the transmitter.

It is expedient if a plurality of inductive elements are so arranged and interconnected with reference to the transmitter that a position measurement process can be carried out which is substantially independent of the spacing of the transmitter from the sensor. Basically, the electromagnetic coupling of the transmitter to the inductive element is dependent on its spacing from the inductive element. If this spacing alters, then the sensor signal is effected thereby without an alteration in the relative position between the sensor and the transmitter in a direction transverse to that of the spacing. Due to the arrangement of a plurality of inductive elements in accordance with the invention, this spacing-dependency can be compensated so that the relative position between the sensor and the transmitter transverse to the direction of the spacing will be independent of any alteration in the spacing between the sensor and the transmitter along said direction of spacing.

It is expedient hereby if a transmitter is positioned between two mutually spaced inductive elements. In particular here, the inductive elements are directed in opposite senses. However, they could also be directed in the same sense. If a process involving the formation of the difference with regard to the sensor signals from the two inductive elements is carried out, then the spacing-dependency is thereby eliminated. Provision may also be made for a process involving the formation of the sum with regard to the sensor signals from the two inductive elements to be carried out. The spacing between the transmitter and the sensor can of course be determined from the sum signal. Thus, in accordance with the invention, a process for determining the position between the sensor and the transmitter in a direction transverse to the direction of spacing between the transmitter and the sensor can be carried out and, in addition, a positional determination in regard to the spacing between the sensor and the transmitter can be effected i.e. in respect of the height at which the transmitter is disposed above the sensor.

In one advantageous variant of an embodiment, the inductive element is disposed on a flexible support means. In particular thereby, the inductive element is disposed on a flexible foil. The support means together with the inductive element deposited thereon can then be given a certain shape so that, for example, the support means and the inductive element can be adapted to the contours of a track guidance system or the like. It may be advantageous for example, if, due to a wave-like movement of the transmitter, the measurement path is matched to the movement of the transmitter in such a manner that the spacing between the sensor and the transmitter is kept substantially constant. In this case, the inductive element must likewise be arranged such as to have a wave-like shape. This can be achieved with the aid of a flexible support means which is positioned on a corresponding wave-like background. In particular, there is provided a single evaluating unit which carries out the process of forming a difference and/or of forming a sum so as to obtain a corresponding measurement signal; in particular, in accordance with the invention, provision is made for a plurality of sensor elements and more especially a plurality of inductive elements to be associated with an evaluating unit.

It is especially very advantageous if the sensor and/or the transmitter are constructed in such a manner that, by virtue of the corresponding shaping, a certain characteristic curve of the position measuring system will be set up for the sensor signal in dependence on a measurement path. A particular characteristic curve that is desirable for an application can thereby be established.

It is expedient if an error signal is derivable from the evaluating unit, whereby the evaluating unit is adapted to be checked as to whether one or more parameters of the inductive element lie within a tolerance range. In particular, it is checked as to whether the Q factor and/or the effective inductance does not deviate too far above or too far below still tolerable values. Thus, a plausibility check is carried out by means of which, for example, a break in a coil, a short circuit or a failure of the transmitter or the movement thereof away from the measurement region can be detected.

BRIEF DESCRIPTION OF THE DRAWINGS

The following description of preferred embodiments taken in conjunction with the drawing will serve for a more detailed explanation of the invention. Therein

DETAILED DESCRIPTION OF THE INVENTION

Figure 1:
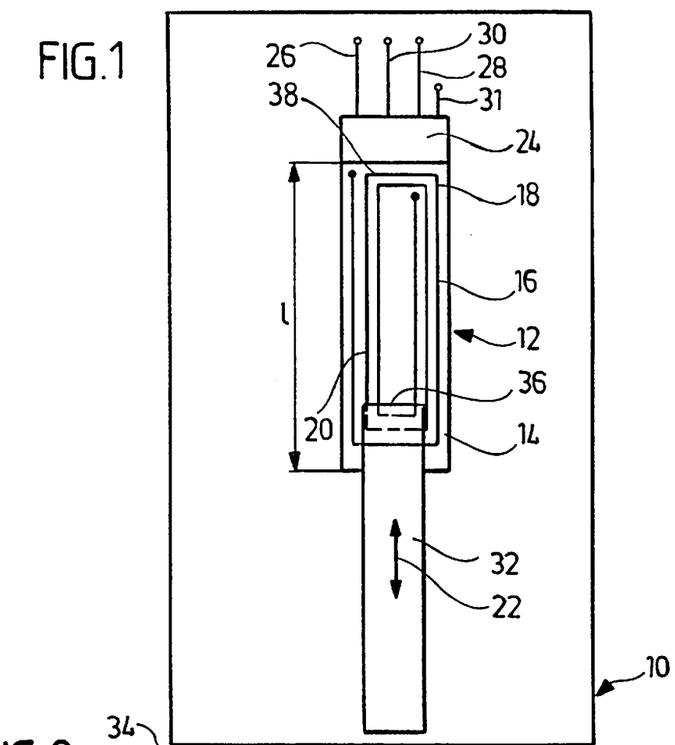
FIG. 1 shows a schematic illustration of a first embodiment of the position measuring system in accordance with the invention in the form of a top view.

In a first embodiment of a position measuring system in accordance with the invention which bears the general reference 10 in FIG. 1, there is provided an especially stationary sensor 12 which comprises a circuit board 14 upon which a flat coil 16 is seated as the inductive element. In particular, the flat coil 16 is a printed coil which is printed onto the circuit board 14.

The flat coil 16 comprises a plurality of windings 18 and thereby occupies a surface region 20. In the embodiment shown in FIG. 1, the mutually spaced and substantially parallel windings are in the form of a spiral. Thereby, the windings 18 exhibit a unitary winding sense.

Provision may also be made for the windings to adopt a meandering form having an alternating winding sense (not shown in the drawing).

The flat coil 16 is aligned in a direction 22 whilst a linear dimension 1 of the flat coil 16 substantially defines the measurement path which is measurable by means of the position measuring system 10 in in accordance with the invention.

An evaluating unit 24 is provided for evaluating a sensor signal from the sensor 12. In particular, this is arranged on the circuit board 14 so that the sensor 12 and the evaluating unit 24 are integrated on the circuit board 14. The evaluating unit 24 is known. For example, it comprises two voltage supply inputs 26, 28, a signal output 30 and possibly also an error output 31. An oscillator is integrated into the evaluating unit 24, the flat coil 16 being coupled to said oscillator in such a manner that parameters of the oscillator such as the frequency and the Q factor thereof are affected by the flat coil 16. As an alternative thereto, the flat coil 16 may itself form the inductance in an oscillator.

A transmitter 32 consisting of a metallic material is displaceable above the flat coil 16, said transmitter being in the form of a tongue or a hoop for example. The transmitter 32 is a passive transmitter which is directly coupled electromagnetically to the flat coil 16 and current does not have to be applied thereto. Hereby, the transmitter 32 is arranged on an object at a distance above the flat coil 16 (this distance is perpendicular to the plane of the drawing in FIG. 1), the relative positioning of this object along the direction 22 relative to the sensor 12 being that which is to be determined.

It is advantageous if the flat coil 16 is screened by a "magnetic cage" 34 which, for example, is formed by ferrite foils or the like.

The position measuring system in accordance with the first embodiment 10 of the invention functions as follows:

If the metallic tongue 32 is moved into the vicinity of the flat coil 16 then there will be an inductive coupling between the flat coil 16 and the transmitter 32. As a consequence thereof, the effective inductance of the flat coil 16 and hence its Q factor will alter due to the electromagnetic coupling to the transmitter 32. The extent of the alteration is dependent thereby upon the surface area of the flat coil 16 which is covered by the transmitter 32, i.e. upon the size of the overlapping region of a projection of the transmitter 32 onto the sensor 12 having an effective sensor region. If, for example, the transmitter 32 is outside the flat coil 16, then the overlapping region is zero and the effective inductance, which is measurable at the flat coil 16, corresponds in essence to the inductance thereof without the mutual inductive coupling of a metal element. The maximum amount of overlap occurs when one end 36 of the transmitter 32 is located above an end 38 of the flat coil 16 and the transmitter 32 is located above the flat coil i.e. when the flat coil 16 is covered to the maximum extent.

The sensor signal, which is detected by the evaluating unit 24, is thereby determined by the effective inductance or Q factor of the flat coil 16; in particular, one such magnitude is the amplitude of an oscillatory circuit of the oscillator to which the flat coil 16 is coupled. This amplitude is dependent on the Q factor of the flat coil 16. Hereby, the flat coil 16 may itself form the inductance of the oscillatory circuit or it may be coupled to another coil in the oscillatory circuit so as to thereby affect the inductance of the oscillatory circuit and thus, in turn, its effective inductance.

Now, since the effective inductance of the flat coil 16 is dependent upon whether the end 36 of the transmitter 32 is located above the flat coil 16 because the surface area with which the metal tongue 32 can be coupled to the flat coil is determined thereby, it can be unambiguously determined as to where the end 36 of the transmitter 32 is located from the determination of the effective inductance of the flat coil 16 via the Q factor of an oscillatory circuit. In turn, the relative position between the transmitter 32 and the sensor 12 with respect to the direction 22 can thereby be unambiguously determined and consequently a position measurement (path measurement) along the direction 22 can be carried out by the device 10 in accordance with the invention. In particular, it can be determined at any time point as to how the transmitter 32 is positioned relative to the sensor 12.

The evaluating unit 24 checks, in particular, as to whether the Q factor or effective inductance of the flat coil 16 lies within a tolerance range. If this is not the case, a signal is sent to the error output 31. For example, the flat coil 16 can thereby be monitored for breaks in the coil in a simple manner.

Figure 2:
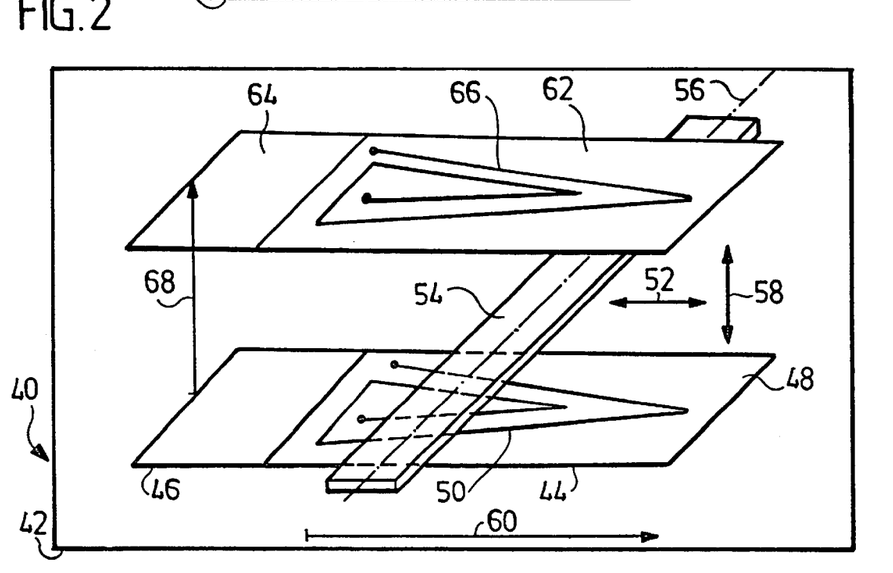
FIG. 2 a schematic perspective illustration of a second embodiment of the position measuring system in accordance with the invention.

In a second embodiment of a position measuring system in accordance with the invention bearing the general reference 40 which is depicted in FIG. 2, a sensor 44, to which an evaluating unit 46 is connected, is arranged in a magnetic cage 42. Hereby, the evaluating unit 46 is basically of similar construction to that of the evaluating unit 24 described hereinabove in conjunction with the first embodiment. In particular, the evaluating unit 46 is arranged on a sensor circuit board 48.

The sensor 44 comprises a flat coil 50 which is in the form of a printed coil on the sensor circuit board 48. The flat coil 50 is provided with triangular windings and is oriented in such a manner that the shape of the flat coil 50 transverse to a direction 52, which is the direction of measurement for the relative position between the sensor 44 and the transmitter 54, varies along this direction of measurement 52.

The transmitter 54 is formed by a metal tongue whose longitudinal direction 36 is oriented transverse to the direction of measurement 52, and which is positioned above the flat coil 52 whilst being spaced therefrom in a vertical direction 58.

The relative position between the transmitter 54 and the sensor 44 in the direction of measurement 52 can be determined by the position measuring system in accordance with the invention. If the transmitter is displaced in the direction of measurement 52, then, insofar as the transmitter 54 is positioned above the sensor 44, the projected surface area of the transmitter 54 (direction of projection 58) onto the sensor 44 is independent of the position of the transmitter 54 with reference to the direction of measurement 52.

However, the overlapping area between this projected surface area and an effective sensor region is dependent on this position: the effective sensor region is determined by a surface region of the flat coil 50. Since this surface region alters along a path 60 parallel to the direction of measurement 52 due to the triangular shape of the flat coil 50, the effective sensor region will alter accordingly. The electromagnetic coupling of the metal tongue 54 forming a mutual inductance with the flat coil 50 is dependent upon the size of the possible coupling area of the flat coil 50, i.e. upon the size of the effective sensor region. Since the effective sensor region alters along the path 60, it follows therefrom that the coupling will also alter.

The position of the transmitter 54 on the path 60 can then be unambiguously determined by measuring the effective inductance of the flat coil 50 which is determined by the coupling between the transmitter 54 and the flat coil 50. Consequently, the relative position between the transmitter 54 and the sensor 44 along the direction of measurement 52 can be deduced by measuring the inductance of the flat coil 50 or a magnitude dependent thereon such as the Q factor of an oscillatory circuit to which the flat coil 50 is coupled. The path 60 is thereby determined, in essence, by the length of the flat coil 50 on the sensor circuit board 48.

In a variant on the one-sensor arrangement described, such as is depicted in FIG. 2, a further sensor 62 having an evaluating unit 64 is provided, whereby a flat coil 66, which is constructed in substantially the same manner as the flat coil 50, is arranged on the sensor 62. The sensor 62 is arranged, in particular, in such a manner that the flat coil 66 is located above the flat coil 50 of the sensor 44.

The transmitter 54 is positioned or guided between the sensor 62 and the sensor 44 (two-sensor arrangement).

It is especially advantageous if the two-sensor arrangement comprises one evaluating unit with which the two sensors 44 and 62 are associated so that the two-sensor arrangement will emit an appropriate signal via the single evaluating unit.

The sensor signal, i.e. the effective inductance of the flat coil 50 or a magnitude dependent thereon, is dependent on the spacing between the transmitter 54 and the flat coil 50 in the form of an inductive element in the vertical direction 58. In particular, the coupling of the metal tongue 54 to the flat coil 50 in the form of a mutual inductance becomes greater, the smaller the spacing in the vertical direction 58. Thus, when there is a variation in this spacing of the transmitter 54 above the flat coil 50, then a change in signal will occur which does not arise from an alteration in the relative position between the transmitter 54 and the sensor 44 along the direction of measurement 52.

Alterations in the spacing between the transmitter 54 and the sensor 44 in the vertical direction 58 can be taken into account by the further sensor 62. In particular, a process of evaluating the difference between the sensor signal from the flat coil 66 and that from the flat coil 50 is provided for this purpose. Such a difference signal is then substantially independent of the spacing of the transmitter 54 relative to the flat coil 50 (and consequently, of the spacing of the transmitter 54 from the flat coil 66). By virtue of such an evaluation process, the path 60 along the measurement direction 52 for the relative position between the transmitter 54 and the sensor 44 can thereby be determined even if the spacing between the transmitter 54 and the sensor 44 alters.

In addition thereby, provision may also be made for a process of forming the sum of the sensor signal from the flat coil 50 and that from the flat coil 66 to be carried out. Such a sum signal is then dependent on the spacing of the transmitter 54 relative to the sensor 44 (and thus too on the spacing from the sensor 62). Since this sum signal contains spacing information, the spacing between the transmitter 54 and the sensor 44 can thus be determined therefrom; thus, a path 68 along the direction 58 can also be determined.

Figures 3, 4:
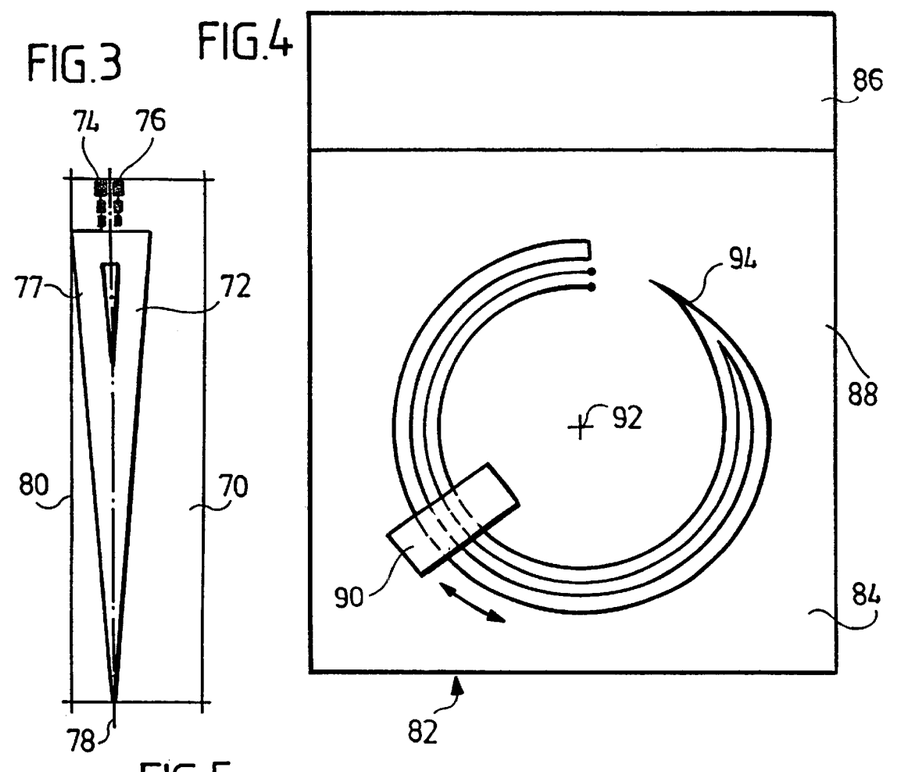
FIG. 3 a top view of a sensor having an inductive element in the form of a printed coil.
FIG. 4 a schematic illustration of a third embodiment of a position measuring system in accordance with the invention in the form of a top view.

A top view of a copied print pattern of a circuit board 70 incorporating a printed coil 72 of triangular form is shown in FIG. 3. The printed coil 72 is provided with current terminals 74 and 76 between which the windings 77 extend.

A contour line 78 of the triangular structure is aligned substantially parallel to a longer edge 80 of the circuit board. The windings 77 are constructed in such a manner that they are each triangular and the corresponding winding triangles substantially comprise the contour line 78.

In an alternative embodiment, provision may be made for the inductive element to be disposed on a flexible support means such as a flexible foil. The support means can then be adapted to the contours of a machine for example. Wave-like movements of a transmitter could also be captured thereby for example, whereby the spacing between the transmitter and the sensor can be held constant by adapting the support means to a background.

A position measuring system in accordance with the invention can also be employed for making angular measurements especially in conjunction with rotatably guided transmitters (shaft encoders). In a third embodiment which bears the general reference 82 and is depicted in FIG. 4, a sensor 84 and an evaluating unit 86 are arranged on a circuit board 88. A transmitter 90, which is constructed especially in the form of a metal tongue, is rotatable about a rotational axis 92 which is oriented substantially perpendicularly to the circuit board 88, the rotation occurring in a circular track relative thereto.

A flat coil 94 is seated on the sensor 84. This flat coil 94 is a printed coil and is constructed, in particular, in such a manner that its shape transverse to the circular track of the transmitter 90 varies along this circular track. This can be achieved, for example, by forming a triangular structure, such as is depicted in FIG. 3, having a circular contour line 78, i.e. the triangular structure is caused to adopt the form of a ring. A flat coil 34 having a shape of this type is shown in FIG. 4.

Basically the position measuring system in accordance with the invention of the third embodiment 82 functions in a manner similar to that of the position measuring systems that have already been described hereinabove. The transmitter 90 is coupled to the inductance 94. Hereby, the coupling is determined by the overlapping region of a projected surface area of the transmitter 90 onto the sensor 84 and an effective sensor region, i.e. by the overlapping region of the projected surface area of the transmitter 90 on the flat coil 94. Since this overlapping region alters along the circular track of the transmitter 90 due to the corresponding shape of the flat coil 94, the angle of rotation (modulo 2 π) can thus be unambiguously determined from the sensor signal and hence too the position of the transmitter 90 on its circular track.

Figure 5:
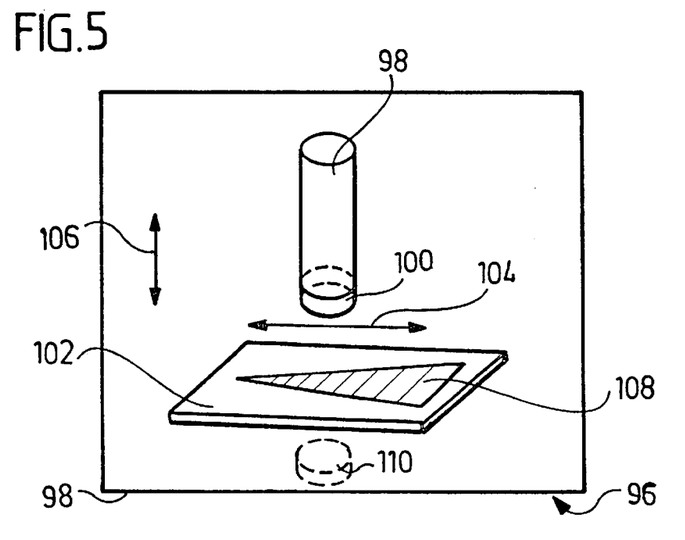
FIG. 5 a schematic perspective illustration of a fourth embodiment of a position measuring system in accordance with the invention utilising a transmitter in the form of a metal tongue.

In a fourth embodiment which bears the general reference 96 and is depicted in FIG. 5, an inductive proximity switch 98 incorporating a sensor 100 is arranged within a magnetic cage 98 which is formed from ferrite foils or the like for example. Here, the sensor comprises an oscillatory circuit including an inductive element. The parameters of the oscillatory circuit will vary when a metal object comes near, and, in particular, the Q factor of the oscillatory circuit will be altered thereby. This alteration can be measured. Inductive proximity switches of this type are employed especially as analogue switches so as to generate an analogue switching signal when a metal object approaches to within a certain distance of the proximity switch 98.

In the position measuring system in accordance with the invention of the fourth embodiment 96, the relative position between a transmitter 102 and the sensor 100 in a direction 104 (the direction of measurement) transverse to a direction of spacing 106 between the sensor 100 and the transmitter 102 can be determined with the aid of the proximity switch 98. Hereby, the transmitter 102 is constructed in such a manner that the overlapping region of the sensor surface area between the transmitter and the sensor incorporating its inductive element will vary along the direction of measurement 104. In the embodiment depicted in FIG. 5, a structure 108 in the form of a triangular surface is arranged on the tongue-like transmitter 102. This structure is formed by a Mu-metal, a ferrite layer or a coated circuit board material for example. The strength of the coupling of the transmitter 102 to the sensor 100 differs in the structure 108 from that in the remainder of the transmitter. This thus means that the structure 108 represents an effective transmitter region which is coupled to the sensor 100 and the shape whereof varies in a direction transverse to a measurement path along the direction 104.

Consequently, due to the fact that the effective transmitter region transverse to the direction 104 varies along this direction, the electromagnetic coupling of the transmitter 102 to the proximity switch 98 also varies. The proximity switch 98 then delivers an unambiguous signal (the Q factor of an oscillator for example), which is dependent on the relative position between the transmitter 102 and the sensor 100. The relative position between the sensor 100 and the transmitter 102 can then be determined from this signal. Hereby, the measurable path along the direction of measurement 104 corresponds substantially to the length of the structure 108 in the direction of measurement 104.

In one variant of an embodiment of the position measuring system 96 in accordance with the invention, there is provided a further proximity switch 110 which is aligned such as to be flush with the proximity switch 98, and the transmitter 102 is guided between these two proximity switches 98 and 110. Hereby, a structure, which corresponds to the structure 108, is provided on the side of the transmitter 102 facing the proximity switch 110.

By virtue of an arrangement comprising two proximity switches 98 and 110 together with a transmitter 102 guided therebetween, the spacing-dependency of the proximity switch signal in regard to the spacing in the direction of spacing 106 between the sensor 100 and the transmitter 102 can be minimised by evaluating the difference between the signals from the two proximity switches 98, 110. This distance can also be determined directly by evaluating the sum of the signals from the two proximity switches 98 and 110.

Instead of employing available analogue proximity switches 98 and 110, the sensors could also be provided directly in the form of inductive elements, i.e. coils could be provided which are connected to an evaluating unit. The use of "ready-made" proximity switches 98, 110 has the advantage that the relative position between the transmitter 102 and the sensor 110 along the direction of measurement 104 is directly derivable from the voltage signal of the proximity switches or from the difference voltage signal.

In another embodiment of a structure 112 on the transmitter 114, a plurality of triangular surfaces 116 are arranged on the transmitter 114 in order to thereby create an effective transmitter region which varies transversely relative to the direction of measurement 104. Such a triangular surface 116 is formed by a Mu-metal or by a ferrite coating for example. In the embodiment shown in FIG. 6, the structure 112 comprises three triangular surfaces 116. Here, the contour lines of the triangles formed by the outline contour of a triangular surface 116 are aligned substantially parallel to a side edge 118 of the transmitter 114 whereby the respective contour lines of the triangular surfaces 116 are parallel and mutually spaced. The peaks of the triangular surfaces 116 lie on a line which is parallel to a narrower side edge 120 of the transmitter 114.

Figure 7:
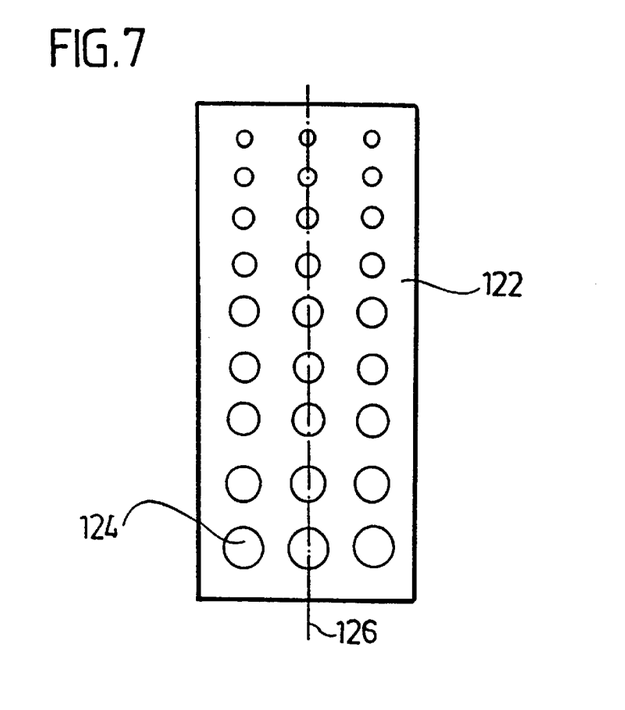
FIG. 7 a top view of a further embodiment of a metal tongue.

In a further embodiment of a transmitter 122 in accordance with the invention which is depicted in FIG. 7, the transmitter is provided with through openings 124 whereby the size of an opening and/or the density of the openings 124 on the surface alters transversely relative to a longitudinal direction 126 of the transmitter 122. Now if the longitudinal direction 126 is aligned along the direction of measurement 104, then the effective transmitter region transverse to the direction of measurement 104 will vary along the direction of measurement 104 so that the strength of the coupling of the transmitter 122 to a sensor is correspondingly dependent on the relative position between the sensor and the transmitter 122 taken with reference to the direction of measurement 104.

Figure 6:
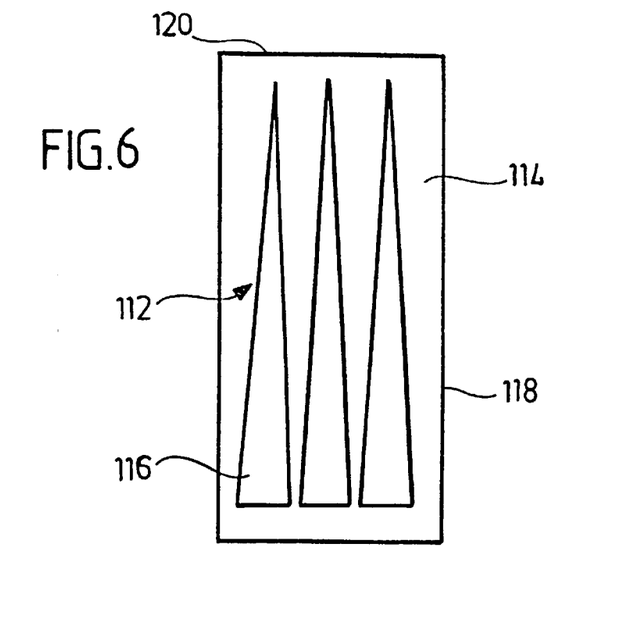
FIG. 6 a top view of an embodiment of a metal tongue.

In the fourth embodiment of a position measuring system in accordance with the invention, a transmitter may also be in the form of a shaft encoder whereby an appropriate structure of the transmitter is then guided on a circular track and the effective transmitter region on the circular track varies relative thereto. This can be achieved for example in that a triangular structure analogous to that shown in FIGS. 5 or 6 is formed into the shape of a ring; as an alternative thereto for example, provision may be made for openings analogous to those in the embodiment shown in FIG. 7 to be distributed over a circular track, said openings having varied dimensions and/or density so that the effective transmitter region, which is applicable to the sensor, along a circular line will vary transverse to said circular line.

Figure 8A:
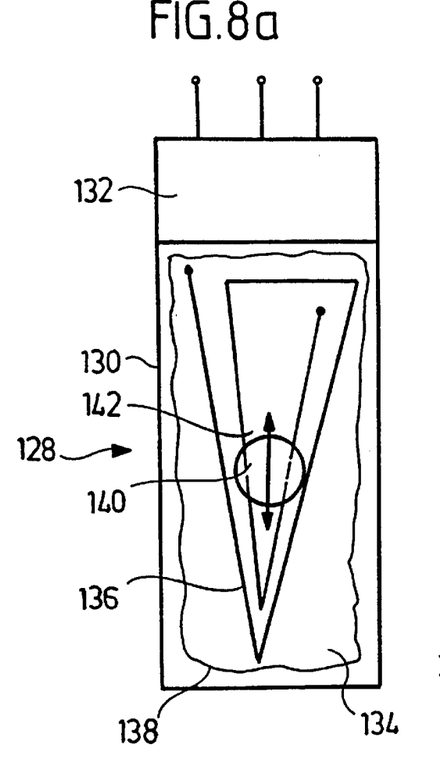
FIG. 8a a schematic illustration of a fifth embodiment of a position measuring system in accordance with the invention in the form of a top view.

In a fifth embodiment bearing the general reference 128 which is depicted in FIG. 8a, an evaluating unit 132 and a sensor 134 are arranged on a circuit board 130. Here, the sensor 134 comprises a flat coil 136 in the form of a printed coil; the shape of this coil corresponds to the printed coil 72 shown in FIG. 3 for example, and an effective sensor region thereof varies correspondingly in a direction transverse to the direction of measurement.

A soft magnetic material indicated by the reference number 138 is mounted on the circuit board 130.

In one variant of an embodiment, the circuit board 130 has soft magnetic material wound around it.

A magnet 140, whose position relative to the sensor 134 can vary in a direction of measurement 142, is employed as the transmitter. The flat coil 136 is subjected to the magnetic field of the transmitter 140 and its effective inductance will thus be varied thereby.

The magnetic field of the magnet 140 causes local saturation of the soft magnetic material 138. The effective inductance of the flat coil 136 varies as a result of this local saturation effect. Since the saturation effect is only local and the shape of the flat coil 136 varies in a direction transverse to the direction of measurement 142, the inductance will alter along the direction of measurement 142 in dependence on the position of the magnet 140 above the flat coil 136.

A Mu-metal may be employed as the soft magnetic material for example.

As an alternative hereby or in addition thereto, provision may be made for the shape of the flat coil 136 not to vary substantially along the direction of measurement (c.f. for example, the flat coil 16 according to the first embodiment shown in FIG. 1), but rather, for the soft magnetic material to be applied in such a manner that its shape varies in a direction transverse to the direction of measurement. For example, a triangular Mu-metal strip or a corresponding ferrite coating is then arranged on the circuit board 130. The effect thereof is that an effective sensor region along the direction of measurement varies transversely of said direction of measurement.

Due to the relatively strong field applied to the flat coil 136 by the magnet 140, the effective inductance can be easily measured especially as changes in signal level in the order of magnitude of 20 percent or more can occur. The inductance itself can, for example, be determined by measuring the frequency of an oscillator signal from an oscillator which is coupled to the flat coil 136. Hereby, the frequency is dependent on the square root of the effective inductance of the flat coil 136.

Figure 8B:
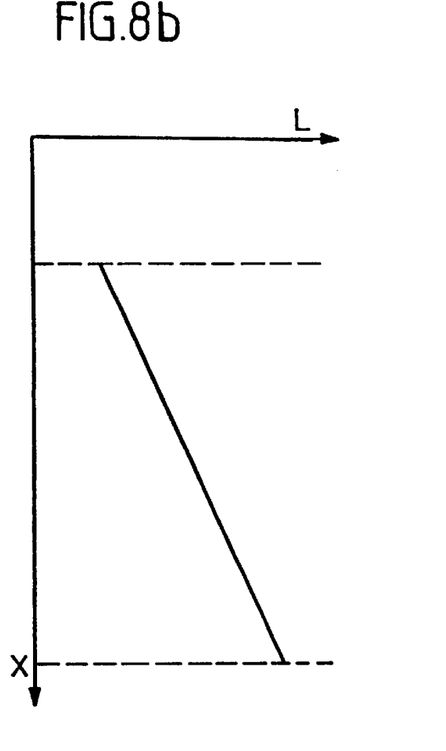
FIG. 8b an inductance (L)—position (x) diagram, wherein the dependency of the inductance of the inductive element is depicted in dependence on the location of a transmitter magnet (FIG. 8a) and FIG. 9 an embodiment of an inductive element.

By appropriate shaping of the flat coil 136 (or appropriate structuring of the soft magnetic material 138), the alteration of the inductance over the measurement path i.e. over the relative spacing between the transmitter 140 and the sensor 134 in the direction of measurement 140, is substantially linear as is indicated in FIG. 8b.

Figure 9:
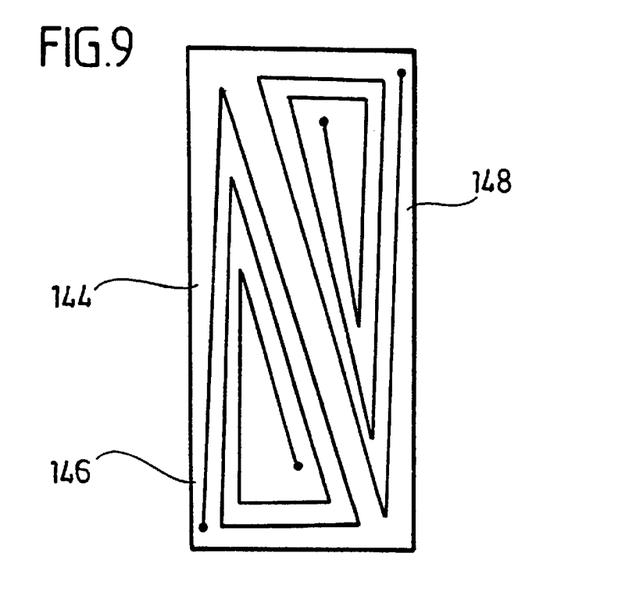

In one variant of an embodiment which is depicted in FIG. 9, a sensor 144 comprises two flat coils 146 and 148 which have triangular windings arranged in mutually opposite senses. A differential system of two flat coils 146, 148 is thus made available. The accuracy of the position determination in particular can be improved in this manner or the effect of interference can be reduced.

Provision may also be made for the transmitter 140 to be guided between two flat coils 136 which may be arranged in the same sense (c.f. FIG. 2) or in opposite senses. The spacing-dependency of a sensor signal upon the spacing of the transmitter 140 relative to the sensor 144 can thereby be reduced.

In the position measuring system in accordance with the invention, the sensor incorporating the flat coils or the transmitter is constructed in a manner appropriate to the envisaged application. The structuring of the flat coils especially in regard to their length, the number of windings therein and their shape, in particular geometrical shape, or the formation of a structure on the transmitter thereby affects the length of the measurement region, the accuracy of the measurement and the resolution of the measurement. In accordance with the invention, absolute path (position) measurements having a resolutional accuracy of at least one thousandth of the measured position can be achieved. The transmitter does not need to be in the form of an active element thereby, but rather a passive element that is coupled electromagnetically to the sensor suffices, especially by virtue of the mutual inductance created thereby. In particular, the inductive elements of the sensor may be in the form of flat coils which can be printed, whereby the manufacturing spread thereof is much smaller than is the case for wound coils for example.

In accordance with the invention, the location information in regard to the relative positioning between the sensor and the transmitter is contained in the geometrical structure of the flat coil (or in a soft magnetic structure) and/or of the transmitter and in the relative positioning thereof. Effective transmitter regions which are coupled to a sensor, or, effective sensor regions to which a transmitter is coupled, vary along a direction of measurement of the relative positioning between the sensor and the transmitter whereby an absolute extent of path can be determined from this variation in a non-contact making manner. Thereby, it is basically irrelevant as to whether the transmitter or the sensor is arranged on a movable element. By appropriate geometrical shaping of the effective sensor region and/or the effective transmitter region, a certain characteristic curve of the position measuring system in accordance with the invention can be set up in a deliberate manner.

The location information is read out directly from the effective inductance of the inductive element and/or the change in Q-factor. The latter can be determined in a simple manner, for example, from the magnitude or the frequency of an oscillator to which the inductive element is coupled.

The present disclosure relates to the subject matter disclosed in German Patent Application No. 100 25 661.9 of May 24, 2000 the entire specification of which is incorporated herein by reference.

What is claimed is:

1. A position measuring system comprising:
   a transmitter;
   a sensor with an inductive element to which the transmitter is coupled electromagnetically, said inductive element being essentially flat and designed as a printed coil; and
   an evaluating unit;
   wherein:
   the sensor and the transmitter are adapted to be positioned relative to one another;
   a measuring path extends along the inductive element; and
   the inductive element is coupled to an oscillator which is affected by the Q factor and/or the effective inductance of the inductive element, the Q factor and/or the effective inductance of the inductive element being determined by the size of an effective sensor region to which the transmitter is coupled and the sensor being designed in such manner that its shape transverse to the measuring path varies along the measuring path so that the size of the effective sensor region to which the transmitter is coupled is dependent on the relative position between the transmitter and the sensor along the measuring path in a direction transverse to a direction of separation therebetween.

2. A position measuring system in accordance with claim 2, wherein the Q factor and/or the effective inductance of the inductive element is also determined by the size of an effective transmitter region which is coupled to an effective sensor region.

3. A position measuring system in accordance with claim 2, wherein the size of the effective transmitter region which is coupled to the effective sensor region is dependent on the relative position between the transmitter and the sensor in a direction transverse to a direction of separation therebetween.

4. A position measuring system in accordance with claim 1, wherein the sensor and/or the transmitter are formed in such a manner that an overlapping region between a projection of an effective transmitter surface area onto the sensor having an effective sensor surface area is dependent on the relative position between the sensor and the transmitter in a direction transverse to the direction of projection.

5. A position measuring system in accordance with claim 1, wherein the evaluating unit determines a characteristic value of the oscillator.

6. A position measuring system in accordance with claim 5, wherein a frequency of the oscillator is determined.

7. A position measuring system in accordance with claim 5, wherein an amplitude of the oscillator is determined.

8. A position measuring system in accordance with claim 1, wherein the evaluating unit is arranged on a circuit board upon which the inductive element is seated.

9. A position measuring system in accordance with claim 1, wherein the measurable distance between the transmitter and the sensor is essentially determined by a linear dimension of the inductive element.

10. A position measuring system in accordance with claim 1, wherein the transmitter is a passive element.

11. A position measuring system in accordance with claim 1, wherein the transmitter comprises a magnet.

12. A position measuring system in accordance with claim 11, wherein a soft magnetic material is arranged at or in the vicinity of the inductive element.

13. A position measuring system in accordance with claim 12, wherein the soft magnetic material is arranged in such a manner that it is adapted to be brought into a state of local saturation in an effective sensor region.

14. A position measuring system in accordance with claim 12, wherein a soft magnetic material is deposited on a circuit board upon which the inductive element is seated.

15. A position measuring system in accordance with claim 12, wherein a circuit board, upon which the inductive element is seated, has a soft magnetic material wound therearound.

16. A position measuring system in accordance with claim 12, wherein the soft magnetic material is arranged in a form such that the dimensions of its shape transverse to a measurement path vary along said measurement path.

17. A position measuring system in accordance with claim 16, wherein the soft magnetic material is arranged in the form of a triangle.

18. A position measuring system in accordance with claim 1, wherein the inductive element comprises triangular windings.

19. A position measuring system in accordance with claim 1, wherein the inductive element extends over an angular range for the purposes of measuring revolutions.

20. A position measuring system in accordance with claim 19, wherein the angular range comprises a substantially full circle.

21. A position measuring system in accordance with claim 1, wherein the transmitter comprises an electrically or magnetically conductive element.

22. A position measuring system in accordance with claim 1, wherein a projected overlapping area between an effective transmitter area and the inductive element varies along a measurement path.

23. A position measuring system in accordance with claim 22, wherein the transmitter is designed in such a manner that an effective transmitter region, which is coupled to the inductive element, varies in shape transverse to a measurement path along said measurement path.

24. A position measuring system in accordance with claim 23, wherein the transmitter is provided with a triangular structure.

25. A position measuring system in accordance with claim 23, wherein the effective transmitter region is formed by a coating on the transmitter.

26. A position measuring system in accordance with claim 23, wherein the transmitter is provided with recesses.

27. A position measuring system in accordance with claim 23, wherein the sensor is comprised by an inductive proximity sensor which comprises an oscillatory circuit with an inductive element.

28. A position measuring system in accordance with claim 21, wherein a magnetic screening is provided for the inductive element.

29. A position measuring system in accordance with claim 1, wherein the sensor comprises a plurality of inductive elements.

30. A position measuring system in accordance with claim 29, wherein the sensor comprises a plurality of tracks formed by inductive elements.

31. A position measuring system in accordance with claim 29, wherein a plurality of inductive elements are so arranged and interconnected with reference to the transmitter that a position measurement process can be carried out which is substantially independent of the spacing of the transmitter from the sensor.

32. A position measuring system in accordance with claim 31, wherein a transmitter is positioned between two mutually spaced inductive elements.

33. A position measuring system in accordance with claim 32, wherein the inductive elements are directed in opposite senses.

34. A position measuring system in accordance with claim 32, wherein a process of forming the difference with regard to the sensor signals from the two inductive elements is carried out.

35. A position measuring system in accordance with claim 32, wherein a process of forming the sum with regard to the sensor signals from the two inductive elements is carried out.

36. A position measuring system in accordance with claim 1, wherein the inductive element is arranged on a flexible support means.

37. A position measuring system in accordance with claim 36, wherein the inductive element is arranged on a flexible foil.

38. A position measuring system in accordance with claim 1, wherein the sensor and/or the transmitter are constructed in such a manner that, by virtue of the corresponding shaping, a certain characteristic curve of the position measuring system is established for a sensor signal in dependence on a measurement path.

39. A position measuring system in accordance with claim 1, wherein an error signal is derivable from the evaluating unit, wherein the evaluating unit is adapted to be checked as to whether one or more parameters of the inductive element lie within a tolerance range.

* * * * *

UNITED STATES PATENT AND TRADEMARK OFFICE
CERTIFICATE OF CORRECTION

PATENT NO. : 6,714,004 B2 Page 1 of 1
DATED : March 30, 2004
INVENTOR(S) : Jagiella It is certified that error appears in the above-identified patent and that said Letters Patent is hereby corrected as shown below:

Column 17,
Lines 4 and 5, change in accordance with claim "2" to: in accordance with claim -- 1 --.

Signed and Sealed this

Seventh Day of September, 2004

JON W. DUDAS
*Director of the United States Patent and Trademark Office*